US012152819B2

(12) United States Patent
Heimberg et al.

(10) Patent No.: US 12,152,819 B2
(45) Date of Patent: Nov. 26, 2024

(54) SWITCHGEAR CABINET ARRANGEMENT WITH A SAFETY FUNCTION, AND A CORRESPONDING METHOD

(71) Applicant: RITTAL GMBH & CO. KG, Herborn (DE)

(72) Inventors: Thorsten Heimberg, Schöffengrund (DE); Steffen Wagner, Burbach (DE)

(73) Assignee: RITTAL GMBH & CO. KG, Herborn (DE)

( * ) Notice: Subject to any disclaimer, the term of this patent is extended or adjusted under 35 U.S.C. 154(b) by 1127 days.

(21) Appl. No.: 16/976,254

(22) PCT Filed: Jan. 25, 2019

(86) PCT No.: PCT/DE2019/100080
§ 371 (c)(1),
(2) Date: Aug. 27, 2020

(87) PCT Pub. No.: WO2019/201372
PCT Pub. Date: Oct. 24, 2019

(65) Prior Publication Data
US 2020/0412107 A1    Dec. 31, 2020

(30) Foreign Application Priority Data
Apr. 20, 2018  (DE) .................... 10 2018 109 604.6

(51) Int. Cl.
*F25B 49/00* (2006.01)
(52) U.S. Cl.
CPC ........ *F25B 49/005* (2013.01); *F25B 2400/08* (2013.01); *F25B 2400/12* (2013.01); *F25B 2500/222* (2013.01)

(58) Field of Classification Search
CPC .................... F25B 49/005; F25B 2400/08; F25B 2400/12; F25B 2500/222
(Continued)

(56) References Cited

U.S. PATENT DOCUMENTS 9,625,195 B2 *  4/2017  Hiraki ................. F24F 1/005
10,076,060 B2   9/2018  Cacho Alonso et al.
(Continued)

FOREIGN PATENT DOCUMENTS

DE    102004030785 B3   11/2005
DE    102004057432 B4   10/2006
(Continued)

OTHER PUBLICATIONS

International Search Report (in English and German) and Written Opinion of the ISA (in German) issued in PCT/DE2019/100080, mailed May 6, 2019; ISA/EP.

*Primary Examiner* — Raheena R Malik
(74) *Attorney, Agent, or Firm* — Harness, Dickey & Pierce, P.L.C.

(57) ABSTRACT

The invention relates to a switch cabinet arrangement with at least one switch cabinet housing and at least one cooling device for cooling air contained in the switch cabinet arrangement, wherein the cooling device has at least one refrigerant circuit including a flammable refrigerant, wherein the switch cabinet arrangement has at least one refrigerant sensor which detects a concentration of the flammable refrigerant in the air and is evaluated by a control unit which is adapted to trigger a safety function for reducing the concentration of the flammable refrigerant in the air below the threshold value if a threshold value of the concentration is exceeded. A corresponding method is also described.

13 Claims, 7 Drawing Sheets

Figure 1:
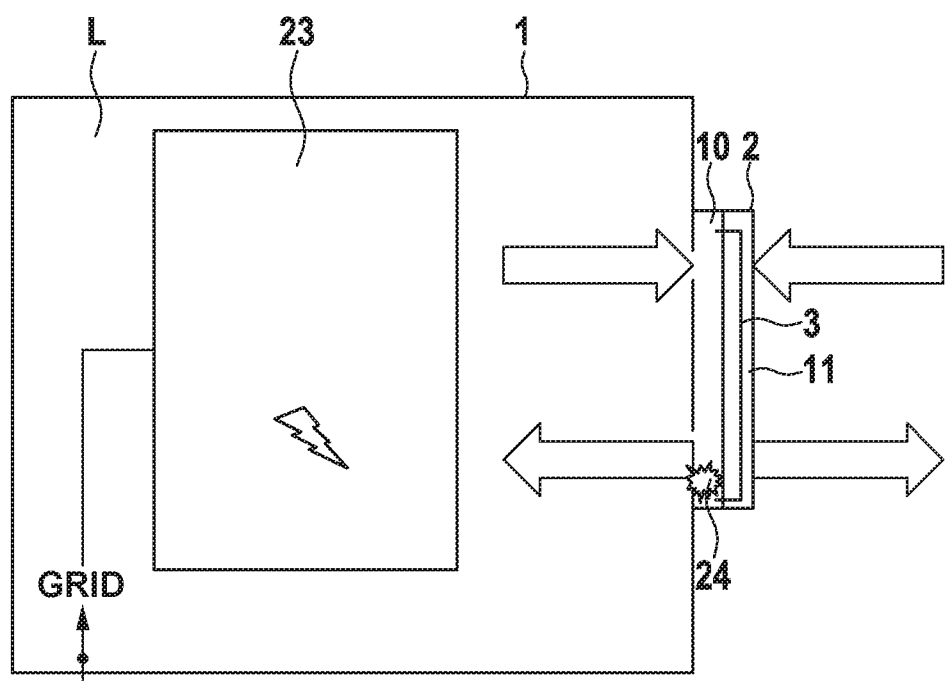

(58) Field of Classification Search
USPC .......................................................... 62/207
See application file for complete search history.

(56) References Cited

U.S. PATENT DOCUMENTS

| | | | | |
|---|---|---|---|---|
| 11,686,491 | B2* | 6/2023 | Noor | ................. F24F 11/36 62/186 |
| 11,781,795 | B2* | 10/2023 | Yamaguchi | ........... F25B 49/005 62/207 |
| 2005/0086952 | A1* | 4/2005 | Nonaka | ................. F25D 11/022 62/129 |
| 2010/0114377 | A1* | 5/2010 | Seifert | ............... H05K 7/20681 700/275 |
| 2015/0114022 | A1* | 4/2015 | Kreeley | ............. H05K 7/20609 29/428 |
| 2016/0245566 | A1* | 8/2016 | Hiraki | ..................... F24F 11/77 |
| 2018/0098456 | A1 | 4/2018 | Schreier et al. | |
| 2019/0203997 | A1* | 7/2019 | Sakae | ..................... F25B 1/00 |
| 2019/0226705 | A1* | 7/2019 | Sakae | ..................... F24F 11/36 |
| 2020/0271344 | A1* | 8/2020 | Ikeda | ..................... F24F 11/36 |

FOREIGN PATENT DOCUMENTS

| | | | |
|---|---|---|---|
| DE | 102009029392 A1 | 3/2011 | |
| EP | 3029397 A1 | 6/2016 | |
| JP | 3617144 B2 * | 2/2005 | ............. B60H 1/008 |
| WO | WO-2015189135 A1 | 12/2015 | |

\* cited by examiner

SWITCHGEAR CABINET ARRANGEMENT WITH A SAFETY FUNCTION, AND A CORRESPONDING METHOD

CROSS-REFERENCE TO RELATED APPLICATIONS

This application is a 371 U.S. National Phase of International Application No. PCT/DE2019/100080, filed on Jan. 25, 2019, which claims the benefit of German Application No. 10 2018 109 604.6, filed on Apr. 20, 2018. The entire disclosures of the above applications are incorporated herein by reference.

BACKGROUND

This section provides background information related to the present disclosure which is not necessarily prior art.

TECHNICAL FIELD

The invention is based on a switch cabinet arrangement with at least one switch cabinet housing and at least one cooling device for cooling air received in the switch cabinet arrangement, wherein the cooling device comprises at least one refrigerant circuit comprising a flammable refrigerant. Such a switch cabinet arrangement is known from DE 10 2004 057 432 B4, wherein the refrigerant circuit comprising the refrigerant has a compressor unit and a condenser unit, wherein the heat occurring in the switch cabinet arrangement is extracted from the air received in the switch cabinet arrangement via the evaporator unit.

DISCUSSION

In the event of a leak in the refrigerant circuit, the flammable refrigerant can be released into the air contained in the switch cabinet arrangement and in particular can also enter the switch cabinet housing, within which electronic components of an electrical switchgear system are usually accommodated. These electronic components can ignite arcs during operation of the switchgear, at which the refrigerant-air mixture can ignite.

According to the Machinery Directive 2006-42-EC it is required that the gases used in a machine do not pose a risk of explosion and fire. In addition, according to the mandatory risk analysis in accordance with EN 12100 § 5.4. b), it must be assumed that individual components of the switch cabinet arrangement and in particular the cooling device can fail during operation. If a refrigerant-carrying component of a switch cabinet cooling device shows a leak and flammable refrigerant from the refrigerant circuit mixes with the air contained in the switch cabinet arrangement, it must be assumed that flammable refrigerant gas can enter the switch cabinet and ignite on components that ignite arcs during operation. To solve this problem it is known from DE 10 2004 057 432 B4 to use $CO_2$ or water as refrigerant. However, non-flammable refrigerants often have a lower heat capacity than flammable refrigerants, which is why it is generally desirable to operate refrigeration appliances with flammable refrigerants.

SUMMARY

This section provides a general summary of the disclosure, and is not a comprehensive disclosure of its full scope or all of its features.

It is therefore the aspect of the invention to further develop a switch cabinet arrangement of the type described above in such a way that the ignition of flammable refrigerants escaping in the event of a leakage in the switch cabinet arrangement is prevented.

Accordingly, it is provided that the switch cabinet arrangement has at least one refrigerant sensor which detects a concentration of the flammable refrigerant in the air contained in the switch cabinet arrangement and is evaluated by a control unit, the control unit being adapted to trigger a safety function for lowering the concentration of the flammable refrigerant in the air below the threshold value if a threshold value of the concentration is exceeded.

The threshold value may, for example, be determined in such a way that the formation of an inflammable stoichiometric ratio between the flammable refrigerant and the air contained in the switch cabinet arrangement or the oxygen content of the air is prevented. However, the threshold value can also be set so low that a much lower concentration already triggers the safety function. Since the volume of air contained in the switch cabinet arrangement is known, the extent of the leak can be deduced from the increase in concentration and, if necessary, the safety functions to be initiated can then be selected from a number of existing safety functions.

The at least one refrigerant sensor can have exactly one gas sensor with a single-channel signal output or several redundant gas sensors with a single-channel signal output. For example, the sensor may be a single-channel sensor that is sensitive to flammable refrigerants such as r32, r1234yf, r1234ze, propane, butane and the like. Alternatively, several sensors can be used that are sensitive to at least one flammable refrigerant, such as one of the previously mentioned examples. The multiple sensors can be used redundantly to the gas sensors, whereby the sensors output their signal in a single channel. Two single-channel non-dispersive infrared (NDIR) sensors can be used as sensors, which react sensitively to the flammable refrigerant, e.g. to one of the refrigerants mentioned above as an example.

The at least one refrigerant sensor can be located in a floor area of the switch cabinet arrangement, at an air inlet of the cooling device open to the inside of the switch cabinet, or at an air outlet of the cooling device open to the inside of the switch cabinet. The at least one refrigerant sensor, when located at the air inlet or air outlet of the cooling device, may be located in the internal air circuit of the cooling device. For example, a first refrigerant sensor may be located in the inner air circuit of the refrigeration appliance in the inlet of an evaporator and a second refrigerant sensor may be located in the inner air circuit of the refrigeration appliance in the outlet of the evaporator. In particular, a first refrigerant sensor may be located upstream of the upstream side of an evaporator in the inner air circuit of the refrigeration appliance in the direction of air flow through the inner air circuit of the refrigeration appliance. A second refrigerant sensor may be located downstream of the downstream side of an evaporator in the internal air circuit of the refrigeration appliance in the direction of air flow through the internal air circuit of the refrigeration appliance. The heat exchanger can be an air/refrigerant heat exchanger in particular.

The safety function may have a closure mechanism of the cooling device by which an air inlet of the cooling device open to the inside of the switch cabinet and/or an air outlet of the cooling device open to the inside of the switch cabinet can be closed. In the event of a leak, it is thus possible, if necessary, to selectively close a single air passage opening between the inner air circuit of the cooling device and the inside of the switch cabinet or both air passage openings between the inner air circuit of the cooling device and the inside of the switch cabinet in order to prevent the flammable refrigerant from entering the inside of the switch cabinet where the electronic components are located.

The safety function may further comprise a ventilation mechanism with at least one closing member which can be closed between an inner air circuit and an outer air circuit of the cooling device between an open position and a closed position, wherein in the closed position of the closing member the outer air circuit and the inner air circuit are fluidically separated from each other, and wherein in the open position of the closing member ambient air is discharged from the outer air circuit into the inner air circuit and from the inner air circuit into the outer air circuit and from there into the environment of the switch cabinet arrangement.

With the aid of the closing element an air short circuit can be established between the inner air circuit and the outer air circuit of the cooling device, which are fluidically separated from each other during normal operation of the cooling device. Via the air short circuit it is possible to lead the air inside the switchgear cabinet arrangement containing the refrigerant out of the switchgear cabinet arrangement, for which purpose the fans of the cooling device can be used for air transport, if necessary.

For example, an air-refrigerant heat exchanger of the refrigerant circuit may be located in the air inner circuit, which divides the air inner circuit into a section facing an upstream side of the air-refrigerant heat exchanger and a section facing a downstream side of the air-refrigerant heat exchanger, wherein the outer air circuit can be opened via a first closing element of the closing member to the portion facing the upstream side of the air-refrigerant heat exchanger and wherein the outer air circuit can be opened via a second closing element of the closing member to the portion facing the downstream side of the air-refrigerant heat exchanger.

The safety function may have a ventilation mechanism through which the switch cabinet arrangement is ventilated with ambient air and the air contained in the switch cabinet arrangement is discharged into the environment of the switch cabinet arrangement. The ventilation mechanism may provide emergency cooling of the air contained in the cabinet assembly in the event of failure of the cooling device, which is usually associated with leakage of the cooling device.

The safety function may include a blow-out valve of the refrigerant circuit controlled by the control unit, through which the flammable refrigerant is blown out into the external air circuit of the refrigeration appliance.

The safety function may also have an inert gas supply which can be opened to the inside of the switch cabinet arrangement via a valve controlled by the control unit. The inert gas can be used to dilute the gas mixture contained in the interior of the control cabinet to such an extent that ignition of the gas mixture is not possible in the event of a detected threshold value being exceeded. Instead of the inert gas, a reaction gas can be blown into the interior of the switch cabinet arrangement, which binds the refrigerant gas in the air. Alternatively, the safety function can also have an extinguishing agent supply which can be opened to the inside of the switch cabinet arrangement via a valve controlled by the control unit.

The switch cabinet assembly may also have an air outlet for the air contained in the switch cabinet assembly with the concentration of the flammable refrigerant. A fan may be associated with the air outlet to promote the transport of air from the inside of the switch cabinet assembly to the environment of the switch cabinet assembly. The switch cabinet assembly may also have a fresh air inlet to provide pressure equalization inside the switch cabinet when the fan is activated.

The safety function may include a shutdown function, controlled by the control unit, for a compressor of the cooling device and/or for a fan in the internal air circuit of the cooling device. By deactivating the cooling device completely using the shutdown function, it is possible to prevent further refrigerant from escaping from the refrigerant circuit and thus prevent the refrigerant from entering the cabinet interior.

The safety function may include an electrical emergency stop function activated by the control unit, in which the switch cabinet arrangement and preferably at least the electrical switchgear accommodated in the switch cabinet arrangement is disconnected from the power supply. An electrical switchgear can be any technical device that can generate an electric arc during normal operation or in the event of failure.

The aspect of the invention is also solved by a switchgear cabinet arrangement with at least one switchgear cabinet housing and at least one cooling device for cooling air contained in the switchgear cabinet arrangement, the cooling device having at least one refrigerant circuit which contains a flammable refrigerant, the switchgear cabinet arrangement having at least one pressure sensor which is adapted to detect a pressure loss of the flammable refrigerant in the refrigerant circuit, wherein the pressure sensor is evaluated by a control unit from which a leakage of the refrigerant circuit is inferred if a pressure loss detected by the pressure sensor exceeds a threshold value, the control unit being arranged to trigger one of the above-mentioned safety functions for lowering a concentration of the flammable refrigerant in the air if the threshold value is exceeded.

According to another aspect of the invention, a method is proposed for the operation of a switch cabinet arrangement, in which the switch cabinet arrangement comprises at least one switch cabinet housing and at least one cooling device comprising at least one refrigerant circuit with a flammable refrigerant. The method comprises the following steps:
  cooling the air contained in the switch cabinet arrangement with the cooling device, for which purpose the air is passed through the cooling device;
  monitoring a concentration of the flammable refrigerant in the air for exceeding a threshold value; and
  triggering of a safety function to reduce the concentration of the flammable refrigerant in the air below the threshold value if an exceeding of the threshold value has been detected during monitoring.

The triggering of a safety function may comprise the actuation of a closure mechanism of the cooling device, which closes an air inlet of the cooling device open to the inside of the switch cabinet and/or an air outlet of the cooling device open to the inside of the switch cabinet.

The triggering of a safety function may comprise the actuation of a ventilation mechanism by means of which the switch cabinet arrangement is ventilated with ambient air and the air contained in the switch cabinet arrangement is discharged into the environment of the switch cabinet arrangement.

The actuation of the ventilation mechanism may comprise the actuation of a closing member, adjustable between an open position and a closed position, between an inner air circuit and an outer air circuit of the cooling apparatus, the outer air circuit and the inner air circuit being fluidically separated from one another in the closed position of the closing member, wherein ambient air is transported through the air outer circuit and the air contained in the switch cabinet arrangement is transported through the air inner circuit, and wherein in the open position of the closing element ambient air is discharged from the air outer circuit into the air inner circuit and from the air inner circuit into the air outer circuit and from there into the environment of the switch cabinet arrangement. The cooling device fans can be used for air transport.

The triggering of a safety function may also involve the deactivation of a fan in the internal air circuit of the cooling device and/or the activation of a compressor of the cooling device. In one embodiment, the activation of a safety function involves the deactivation of all active components of the cooling device. Deactivation may also involve electrical disconnection of the electrical switchgear.

The invention is also solved by a method for the operation of a switch cabinet arrangement comprising at least one switch cabinet housing and at least one cooling device comprising at least one refrigerant circuit with a flammable refrigerant, the method comprising the steps:
  cooling the air received in the switch cabinet arrangement with the cooling device, for which purpose the air is passed through the cooling device;
  monitoring a pressure loss of the flammable refrigerant in the refrigerant circuit detected by the pressure sensor for exceeding a threshold value; and
  triggering of a safety function to reduce a concentration of the flammable refrigerant in the air if the threshold value has been exceeded during monitoring.

The invention is also solved by a method for the operation of a switch cabinet arrangement with at least one switch cabinet housing and at least one cooling device comprising at least one refrigerant circuit with a flammable refrigerant, the method comprising the steps:
  cooling the air received in the switch cabinet arrangement with the cooling device, for which purpose the air is passed through the cooling device;
  monitoring the difference between the temperature of the flammable refrigerant in the air inner circuit and the temperature of the flammable refrigerant in the air outer circuit for exceeding a first threshold value and/or monitoring a power consumption of a compressor of the cooling apparatus for falling below a second threshold value;
  triggering a safety function for reducing a concentration of the flammable refrigerant in the air if an exceeding of the first threshold value and/or a falling below the second threshold value has been detected during the monitoring.

Since the capacity absorbed by the compressor depends on the mass flow of the refrigerant through the refrigerant circuit and on the pressure difference of the refrigerant between the inner circuit and the outer circuit, the monitoring of the latter allows the conclusion to be drawn that the refrigerant circuit is leaking. Similarly, a leakage shifts the characteristic points of the Carnot cycle process, which makes it possible to detect a leakage of the refrigerant circuit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are explained using the figures below. Thereby shows:
  FIG. 1 a schematic diagram of a switch cabinet arrangement according to the state of the art; and
  FIGS. 2 to 7 different embodiments of inventive switch cabinet arrangements in schematic representation.

DETAILED DESCRIPTION

Example embodiments will now be described more fully with reference to the accompanying drawings.

The state-of-the-art switch cabinet arrangement shown in FIG. 1 has a switch cabinet housing 1 with a cooling device 2 mounted on it. The invention is basically not limited to switch cabinet arrangements of the constellation shown in FIG. 1 with exactly one switch cabinet housing 1 and exactly one cooling device 2. In particular, a switch cabinet arrangement according to the invention may also have several switch cabinets 1, which, for example, form a switch cabinet row. Likewise, several cooling devices 2 can be provided, or cooling devices that are integrated as inline cooling devices in a row of switch cabinets. The principles of the present invention are also transferable to air conditioning solutions for data centers. For the sake of simplicity, however, the invention is explained in the following figures by means of exemplary switch cabinet arrangements which consist merely of one switch cabinet housing 1 and one cooling device 2 mounted thereon.

The switch cabinet housing 1 usually contains an electrical switchgear 23 which may have components which ignite electric arcs during operation. The internal air circuit 10 of the cooling device 2 and the interior of the switch cabinet housing 1 form an air volume L, which is fluidically separated from the external circuit 11 and thus also from the environment of the switch cabinet arrangement. An evaporator (not shown) of the refrigerant circuit 3 of cooling device 2 is accommodated in the inner air circuit 10 in order to cool the air transported through the inner air circuit of cooling device 2. If, for example, the evaporator or the pipework of the refrigerant circuit 3, insofar as it is accommodated in the internal air circuit 10, has a leakage 24, refrigerant can enter the air volume L in the switch cabinet interior. If the refrigerant is a flammable refrigerant, a flammable air/refrigerant mixture may form inside the switchgear cabinet, which may ignite at the electrical switchgear 23 due to the described arcs.

Figure 2:
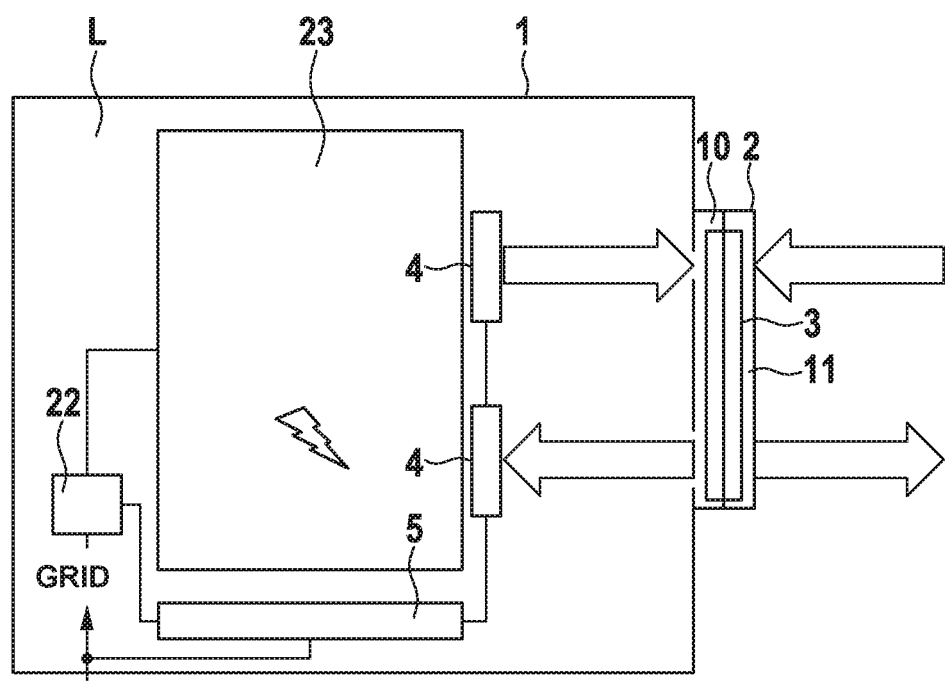

In contrast, FIG. 2 shows a first embodiment of the switchgear cabinet arrangement according to the invention. This additionally has two refrigerant sensors 4 which detect a concentration of the flammable refrigerant contained in the refrigerant circuit 3 in the air inside the switch cabinet arrangement. The measuring signals of the sensors 4 are evaluated by a control unit 5 which is adapted to trigger a safety function if a threshold value for the concentration of the flammable refrigerant in the air inside the switch cabinet arrangement is exceeded. The threshold value may be chosen in particular to represent a minimum concentration necessary for the ignition of the refrigerant contained in the air. However, the threshold value can also be set so low that in practice only a presence test of the refrigerant, i.e. a qualitative test of the air volume L, is carried out.

In the embodiment shown in FIG. 2, control unit 5 is connected to a mains switch 22 which, on command from control unit 5, can de-energize switchgear 23, thus preventing the formation of electric arcs and thus avoiding the risk of ignition of the air-gas mixture contained in the switchgear cabinet arrangement.

Similar to the embodiment shown in FIG. 2, the embodiment shown in FIG. 3 again has a first sensor 4 in the air inlet flow of the cooling device 2 and a second sensor 4 below it in the air outlet flow of the cooling device. The control unit 5, which is connected to the sensors 4, controls an aeration and ventilation mechanism 17. This may, for example, have a fan which blows air from the environment of the switch cabinet arrangement into the interior of the switch cabinet arrangement, in particular into the interior of the switch cabinet with the electronic components 23. The ventilation mechanism 17 can also have an air outlet via which the air L mixed with the refrigerant gas is blown out of the interior of the switchgear cabinet arrangement into the environment of the switchgear cabinet arrangement. The air outlet is preferably associated with the cooling device 2, while the fan for air injection from the environment into the interior of the switchgear cabinet assembly is located at a distance from the air outlet. Preferably, the electrical components 23 are arranged between the air inlet and the air outlet in the direction of air flow between the two, so that the air outlet associated with cooling device 2 keeps cooling device gas escaping from cooling device 2 away from the electronic components 23.

Instead of an air injection, the aeration and ventilation mechanism 17 can also have an air exhaust. In this case, the fan is assigned to the air outlet opening of the aeration and ventilation mechanism 17. It is also conceivable that both an air inlet opening and an air outlet opening of the aeration and ventilation mechanism 17 each have a fan.

Furthermore, the control unit 5 controls a valve 19 of an inert gas supply 18, via which an inert gas is blown into the switch cabinet arrangement in order to inhibit the accumulation of the refrigerant and thus prevent the formation of a flammable gas mixture.

Figure 3:
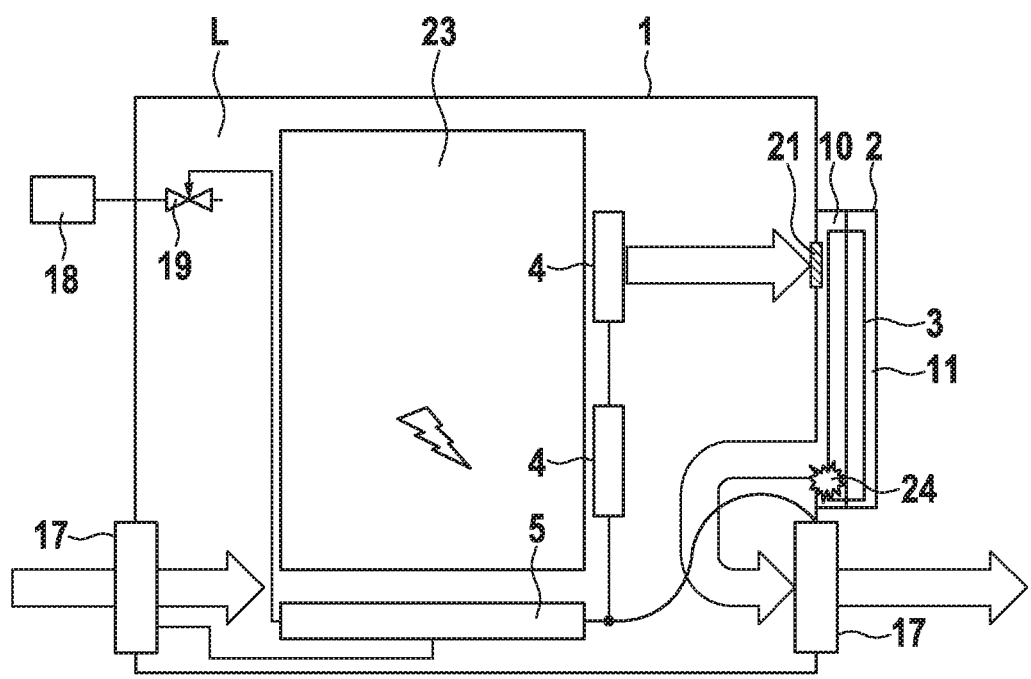

In principle, however, the two safety functions shown in the embodiment as per FIG. 3 can be implemented independently of each other.

Figure 4:
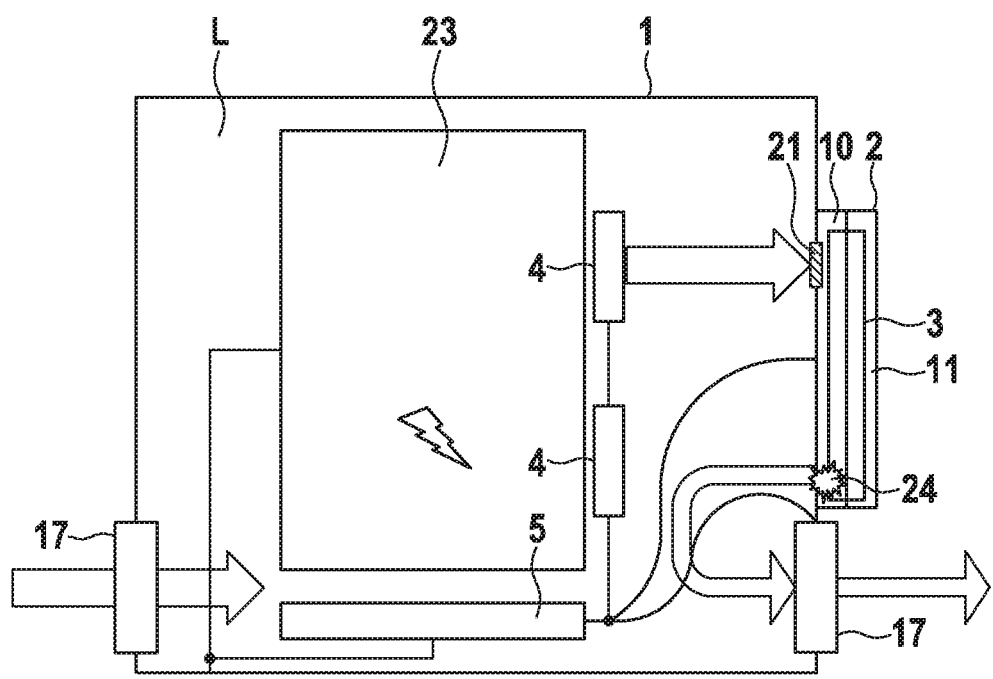

In addition to the aeration and ventilation mechanism 17 already described with reference to FIG. 3, the embodiment shown in FIG. 4 features control of the cooling device 2 by the control unit 5. Accordingly, control unit 5 is adapted to deactivate cooling device 2 when a threshold value for the concentration of the refrigerant in the air L inside the switch cabinet arrangement is detected as being exceeded. This may in particular include deactivation of the fan 21 in the internal air circuit of the cooling device 2 and/or deactivation of the compressor of the refrigerant circuit 3. The refrigerant gas still escaping from the cooling device 2 despite deactivation of the cooling device 2 can be discharged from the interior of the switch cabinet arrangement to the environment of the switch cabinet arrangement via the aeration and ventilation mechanism 17.

Figure 5:
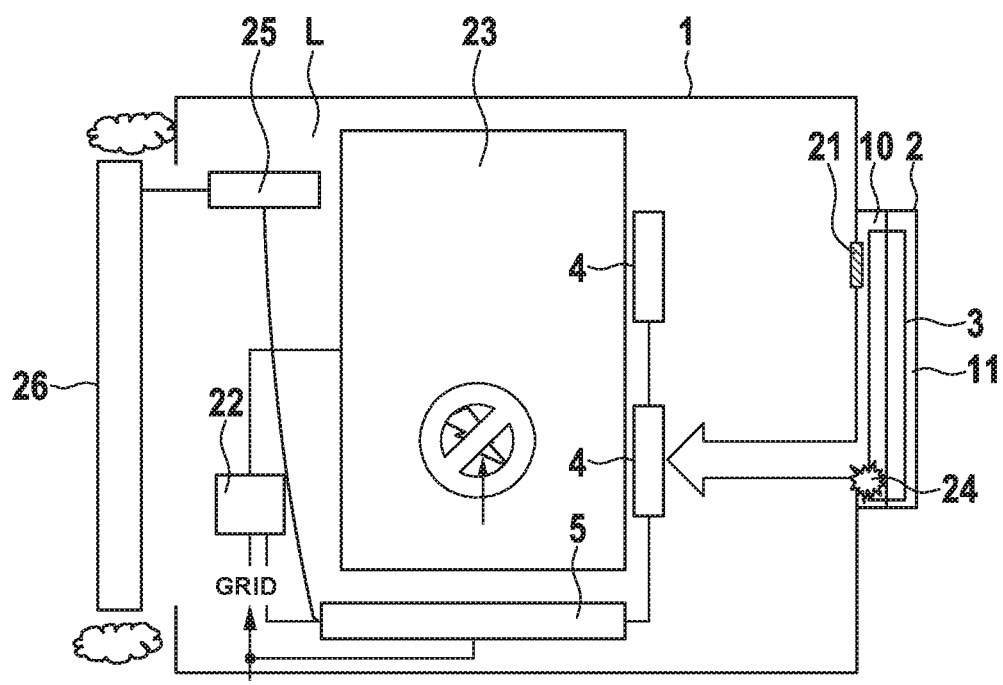

In the embodiment shown in FIG. 5, in addition to the mains disconnection 22 already described with reference to the embodiment shown in FIG. 2, a door opening mechanism 25 is also implemented, which is controlled by the control unit 5 to open a switch cabinet door 26 of the switch cabinet arrangement 1 if a threshold value excess of the concentration of the refrigerant in the air L inside the switch cabinet arrangement has been detected. The door opening mechanism 25 may have a servomotor which is controlled by the control unit 5 to open the switch cabinet door 26 when an exceeding of the threshold value has been detected by means of the sensors 4. Suitable door opening mechanisms are known, for example, to protect the switchgear from overheating in the event of failure of the air conditioning system.

Figure 6:
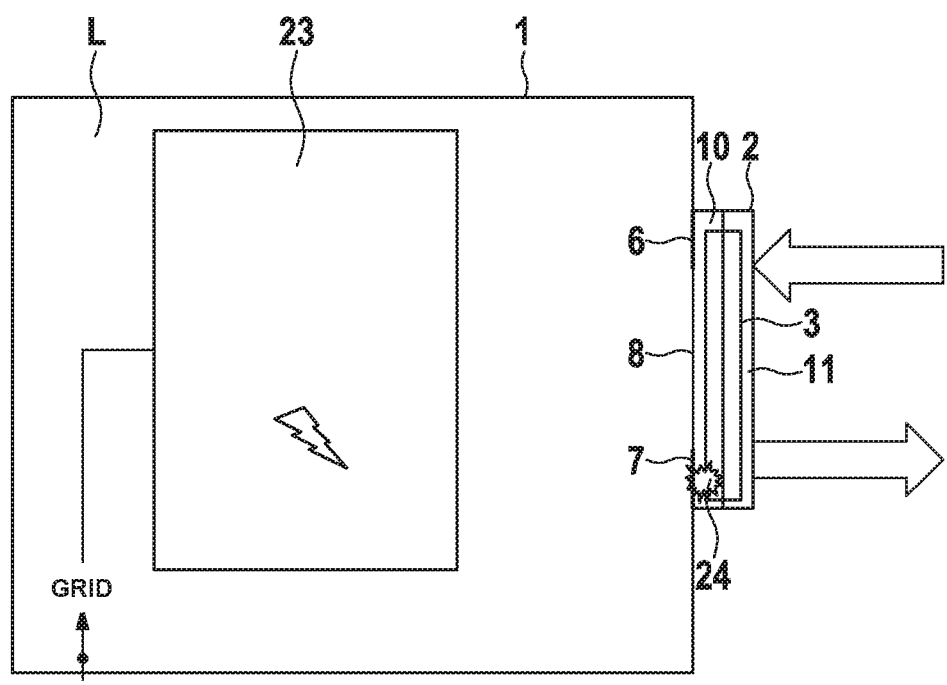
Figure 7:
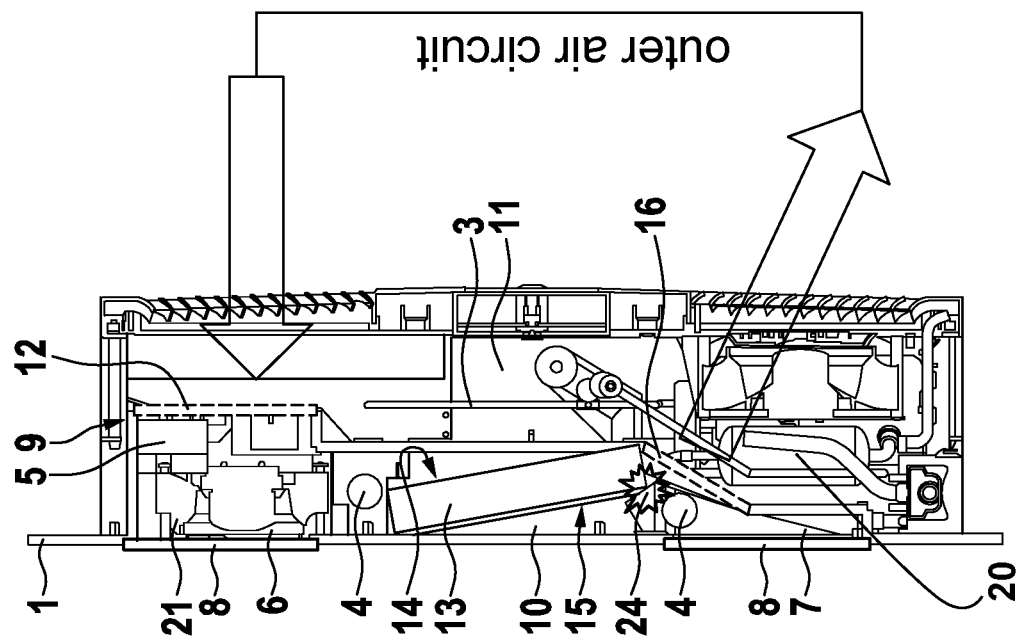
Figure 7:
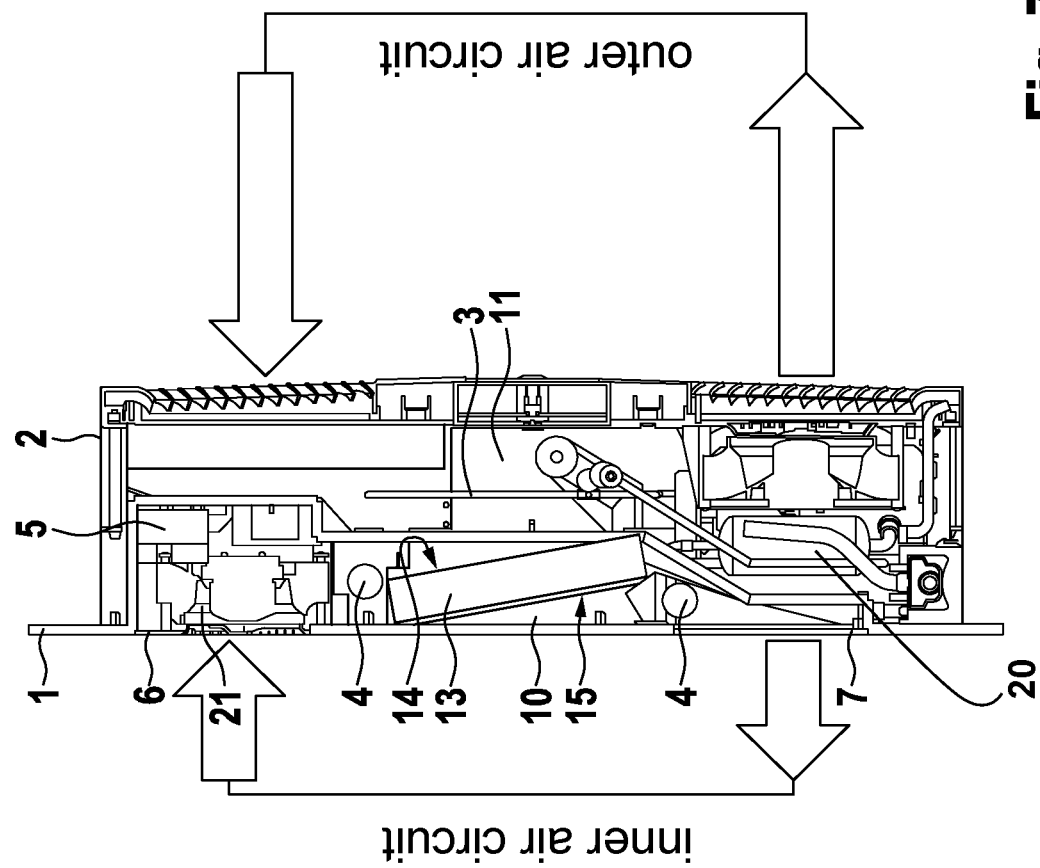

FIG. 6 shows an embodiment in which all the components required to implement the switchgear cabinet arrangement in accordance with the invention are accommodated in the cooling device 2. This means that no structural changes to the switch cabinet enclosure 1 are necessary. Further details of the embodiment of cooling device 2 are shown in FIG. 7. Accordingly, the cooling device 2 has a closure mechanism 8 which can be used to lock an air inlet 6 of the cooling device open to the inside of the cabinet and an air outlet 7 of the cooling device 2 open to the inside of the cabinet. Air inlet 6 and air outlet 7 can be closed independently of each other by separate closing means such as a flap or slide of the closure mechanism 8.

Furthermore, cooling device 2 has a ventilation mechanism 9 which has a two-part closing element 12, 16 between the inner air circuit 10 and the outer air circuit 11 of cooling device 2. In the closed position of the closing element 12, 16, the outer air circuit 11 and the inner air circuit 10 are fluidically separated from each other. In the open position of the closing device 12, 16, ambient air can be discharged from the outer air circuit 11 into the inner air circuit 10 and from the inner air circuit 10 into the outer air circuit 11. Via the air outer circuit 11, the air which has entered the air outer circuit from the air inner circuit can be discharged into the environment of the switch cabinet arrangement.

An air/refrigerant heat exchanger 13 of the refrigerant circuit 3 is arranged in the inner air circuit 10. The heat exchanger 13 has a first sensor 4 on its upstream side 14 and a second sensor 4 on its downstream side 15. The external air circuit 11 can be opened via a first closing element 12 of the closing element to the section facing the upstream side of the air/refrigerant heat exchanger 13. Furthermore, the outer air circuit 11 can be opened via a second closing element 16 to the section facing the downstream side of the air-refrigerant heat exchanger 13.

In the event of a leakage 24 detected by means of the sensors 4, the control unit 5, which is also located inside the unit 2, can control a closure mechanism 8 to close all air passage openings between the inner circuit 10 of the cooling device 2 and the inside of the switch cabinet housing, while opening the closing elements 12, 16, so that an air short circuit is established between the inner circuit 10 and the outer circuit 11 of the cooling device 2.

With the aid of the fans of the cooling device 2, ambient air can then be drawn into the outer circuit 11 via an air inlet opening, blown into the inner air circuit 10 through the first closing element 12, and passed through the inner air circuit 10 and the air heat exchanger 13, in order to pass from the inner circuit 10 back into the outer circuit 11 through a second closing element 16 on an outflow side 15 of the heat exchanger 13, and there to pass from the cooling device 2 into the environment of the switch cabinet arrangement via an air outlet opening of the outer air circuit 11.

With reference to the figures, various embodiments of inventive switch cabinet arrangements and in particular variants for the implementation of the safety function in accordance with the invention have been reproduced. Particularly for the purpose of providing redundant solutions, the safety functions reproduced in the various embodiment forms can also be implemented in any combination with each other without deviating from the invention-compliant gage.

The features of the invention disclosed in the description, in the drawings as well as in the claims can be essential for the realization of the invention either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch cabinet arrangement comprising at least one switch cabinet housing including electrical switchgear and at least one cooling device for cooling air received in the switch cabinet arrangement, the cooling device having at least one refrigerant circuit which has a flammable refrigerant, the cooling device having an air inner circuit and an air outer circuit fluidly separated from each other, the switch cabinet arrangement having at least one refrigerant sensor, which detects a concentration of the flammable refrigerant in said air and is evaluated by a control unit which, if a threshold value of the concentration is exceeded, is adapted to trigger a safety function for reducing the concentration of the flammable refrigerant in the air below the threshold value, wherein in that the safety function comprises a closure mechanism for the cooling device, via which an air inlet of the air inner circuit of the cooling device, which is open towards the inside of the switch cabinet, and/or an air outlet of the air inner circuit of the cooling device, which is open towards the inside of the switch cabinet, is selectively closed by the closure mechanism.

2. The switch cabinet arrangement according to claim 1, in which the at least one refrigerant sensor has exactly one gas sensor with a single-channel signal output or several redundant gas sensors which have a single-channel signal output.

3. The switch cabinet arrangement according to claim 1, in which the at least one refrigerant sensor is arranged in a base region of the switch cabinet arrangement, at an air inlet of the cooling device which is open towards the inside of the switch cabinet, or at an air outlet of the cooling device which is open towards the inside of the switch cabinet.

4. The switch cabinet arrangement according to claim 1, in which the safety function further comprises a ventilation mechanism including the closure member which can be adjusted between the air inner circuit and the air outer circuit of the cooling device between an open position and a closed position, wherein in the closed position of the closure member the air outer circuit and the air inner circuit are fluidically separated from one another, and wherein in the open position of the closing member ambient air is discharged from the air outer circuit into the air inner circuit and from the air inner circuit into the air outer circuit and from there into the environment of the switch cabinet arrangement.

5. The switch cabinet arrangement according to claim 4, in which an air-refrigerant heat exchanger of the refrigerant circuit is arranged in the air inner circuit, which heat exchanger subdivides the air inner circuit into a section facing an inflow side of the air-refrigerant heat exchanger and a section facing an outflow side of the air-refrigerant heat exchanger, wherein the outer air circuit can be opened via a first closing element of the closing member to the section facing the inflow side of the air-refrigerant heat exchanger, and wherein the outer air circuit can be opened via a second closing element of the closing member to the section facing the outflow side of the air-refrigerant heat exchanger.

6. The switch cabinet arrangement in accordance with claim 1, in which the safety function has an aeration and ventilation mechanism via which the switch cabinet arrangement is ventilated with ambient air and the air contained in the switch cabinet arrangement is discharged into the environment of the switch cabinet arrangement.

7. The switch cabinet arrangement according to claim 1, in which the safety function has an inert gas supply which can be opened to the interior of the switch cabinet arrangement via a valve controlled by the control unit.

8. The switch cabinet arrangement according to claim 7, which further comprises an air outlet for the air received inside the switch cabinet arrangement with the concentration of the flammable refrigerant.

9. The switch cabinet arrangement according to claim 1, in which the safety function has a switch-off function, controlled by the control unit, for a compressor of the cooling device and/or a fan in the air inner circuit of the cooling device.

10. A method for operating a switch cabinet arrangement with at least one switch cabinet housing and at least one cooling device which has at least one refrigerant circuit with a flammable refrigerant, the method comprising:
    cooling the air received in the switch cabinet arrangement with the cooling device, for which purpose the air is passed through the cooling device for cooling electrical switchgear in the housing, the cooling device having an air inner circuit and an air outer circuit fluidly separated from each other;
    monitoring a concentration of the flammable refrigerant in the air for exceeding a threshold value; and
    triggering of a safety function for reducing the concentration of the flammable refrigerant in the air below the threshold value if an exceeding of the threshold value has been detected during monitoring, wherein
    the triggering of a safety function includes the actuation of a closure mechanism of the cooling device, via which the air inner circuit of the cooling device, which is open towards the inside of the switch cabinet, and/or an air outlet of the cooling device, which is open towards the inside of the switch cabinet, is selectively closed by the closure mechanism.

11. The method according to claim 10, in which the triggering of a safety function comprises the actuation of a ventilation mechanism, via which the switch cabinet arrangement is ventilated with ambient air and the air contained in the switch cabinet arrangement is discharged into the environment of the switch cabinet arrangement.

12. The method according claim 10, in which the actuation of the ventilation mechanism comprises the actuation of the closure mechanism, which can be adjusted between an open position and a closed position, between the inner air circuit and the outer air circuit of the cooling device, the outer air circuit and the inner air circuit being fluidically separated from one another in the closed position of the closing member, wherein ambient air is transported through the air outer circuit and the air received in the switch cabinet arrangement is transported through the air inner circuit, and wherein in the open position of the closing member ambient air is discharged from the air outer circuit into the air inner circuit and from the air inner circuit into the air outer circuit and from there into the environment of the switch cabinet arrangement.

13. The method according to claim 10, in which the triggering of a safety function comprises the deactivation of a fan in the air inner circuit of the cooling device and/or the deactivation of a compressor of the cooling device.

* * * * *